United States Patent
Schulmeyer et al.

(10) Patent No.: US 6,392,558 B1
(45) Date of Patent: *May 21, 2002

(54) SYSTEM FOR ADDRESS INITIALIZATION OF GENERIC NODES IN A DISTRIBUTED COMMAND AND CONTROL SYSTEM AND METHOD THEREFOR

(75) Inventors: Peter Hans Schulmeyer, Austin, TX (US); Joachim Kruecken, Munich (DE); John M. Pigott, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/677,571

(22) Filed: Sep. 29, 2000

Related U.S. Application Data

(63) Continuation of application No. 09/133,226, filed on Aug. 13, 1998, now Pat. No. 6,166,653.

(51) Int. Cl.[7] ................................................ H04Q 5/22

(52) U.S. Cl. .................... 340/825.52; 340/3.1; 370/438; 370/252; 709/220; 710/9

(58) Field of Search ........................... 340/825.52, 3.1; 370/438, 252; 709/220; 710/9

(56) References Cited

U.S. PATENT DOCUMENTS

| 5,247,464 A | 9/1993 | Curtis ......................... 364/562 |
| 5,297,138 A | 3/1994 | Black ........................... 370/60 |
| 5,371,859 A | 12/1994 | Lennartsson ................. 395/325 |
| 5,760,489 A | 6/1998 | Davis et al. ................ 307/10.1 |
| 5,768,277 A | 6/1998 | Ohno et al. .................. 370/457 |
| 5,828,656 A | 10/1998 | Sato et al. ................... 370/254 |
| 5,872,524 A | 2/1999 | Iida ........................ 340/825.52 |
| 5,920,267 A | 7/1999 | Tattersall et al. ....... 340/825.05 |

*Primary Examiner*—Brian Zimmerman
*Assistant Examiner*—Yves Dalencourt
(74) *Attorney, Agent, or Firm*—Susan C. Hill; Joanna G. Chiu

(57) ABSTRACT

A method and apparatus for assigning unique addresses to each generic "node" in a distributed control system that contains a main controller (52) coupled to a plurality of generic nodes (54) via a distributed communication bus (55). The main controller (52) provides currents and/or voltages to the communication bus (55) via a supply (58). In one embodiment, each node (54) processes the current and voltages to store reference voltages and distance voltages proportional to its distance along the communication bus (55). In another embodiment, each node (54) signals to the main controller (52) when the distance voltage reaches a certain value relative to the reference voltage. The main controller (52) processes the arrival times of these signals to determine a relative distance to each node (54). This distance information is used to assign a unique address to each generic node (54) for identification during normal mode of operation.

34 Claims, 10 Drawing Sheets

SYSTEM FOR ADDRESS INITIALIZATION OF GENERIC NODES IN A DISTRIBUTED COMMAND AND CONTROL SYSTEM AND METHOD THEREFOR

This application is a continuation of U.S. application Ser. No. 09/133,226, filed on Aug. 13, 1998, which is now U.S. Pat. No. 6,166,653.

FIELD OF THE INVENTION

The present invention relates generally to distributed command and control systems for use in transportation, and more particularly to, a process for assigning unique addresses to each generic "node" in a distributed control system that contains a plurality of generic nodes coupled to the same distributed communication bus.

BACKGROUND OF THE INVENTION

In the transportation industry, a common problem is that a distributed communication bus system may be electrically connected to many generic nodes. When a distributed communication bus interconnects many generic nodes, it is difficult to assign a unique address to each node within the distributed system. Due to the difficulty of uniquely addressing many generic nodes intercoupled together, many electrical systems within transportation applications individually program each node or component before placement within the system. By changing each IC or node before placement into the system, each node can be uniquely Identified easily, but such advantage comes at a cost. When devices are programmed with an address before assembly, human error may result in the improper placement of a device programmed as "Device A" into an improper location intended for a "Device B" whereby faulty. operation can occur. This faulty operation may not be capable of easy and cost-effective testing, as is the case for the testing of airbag systems in an automobile. In addition, the overhead for keeping track of individually addressed parts before assembly can be cumbersome. For example, assume that sixteen generic parts are desired in the same communication bus system. If these sixteen parts are generic, then all sixteen parts may be catalogued, stored, and used as one interchangeable part. If an individual tag must be applied to each of the sixteen generic parts, then the process of storing, reusing, repairing, replacing, and assembling the systems becomes much more cumbersome and prone to human error.

As an alternative to uniquely tagging parts before assembly, one may use uniquely configured sockets or physical interconnects for the parts to make each generic part uniquely identifiable. While different in form from the above pre-programmed solution, the disadvantages and risks are the same.

Alternatively, a distributed communication bus system may be avoided in favor of a point-to-point communication system where each of N nodes is directly coupled to a central controller by a respective one of N different and mutually exclusive conductors. This ensures that each node can be uniquely accessed; however, there are many disadvantages to this approach. These N conductive interconnects can quickly become cumbersome within a transportation design, and the costs of such design may be prohibitive. The added interconnection of additional wire will significantly add to the weight of the system or automobile. The interconnection density in an automobile chassis is limited and better dedicated to other more important functions. In addition, N connections may need N pins on an IC, where pin count is severely limited in many microcontroller and digital signal processor (DSP) designs. In general, this brute force method of connecting unique lines to each node in the system is fast becoming unreasonable.

Generally, a need exists in the transportation industry, and others, for a distributed communication bus architecture and methodology which enables generic nodes or components to be intercoupled via a common communication bus connection where unique addressing or tagging of the generic components is still enabled.

DESCRIPTION OF A PREFERRED EMBODIMENT

For clarity, the following description focuses on an automotive embodiment of the present invention. The automotive embodiments considered hereinbelow are illustrated in FIGS. 1–11. The present invention is applicable to any transportation system having a distributed control and command system, and is not intended to be limited to automotive embodiments discussed herein. The method for address initialization of generic nodes in a distributed command and control system of the present invention is not specific to a particular node function, but as illustrated hereinbelow may be used to initialize any number of systems.

Figure 1:
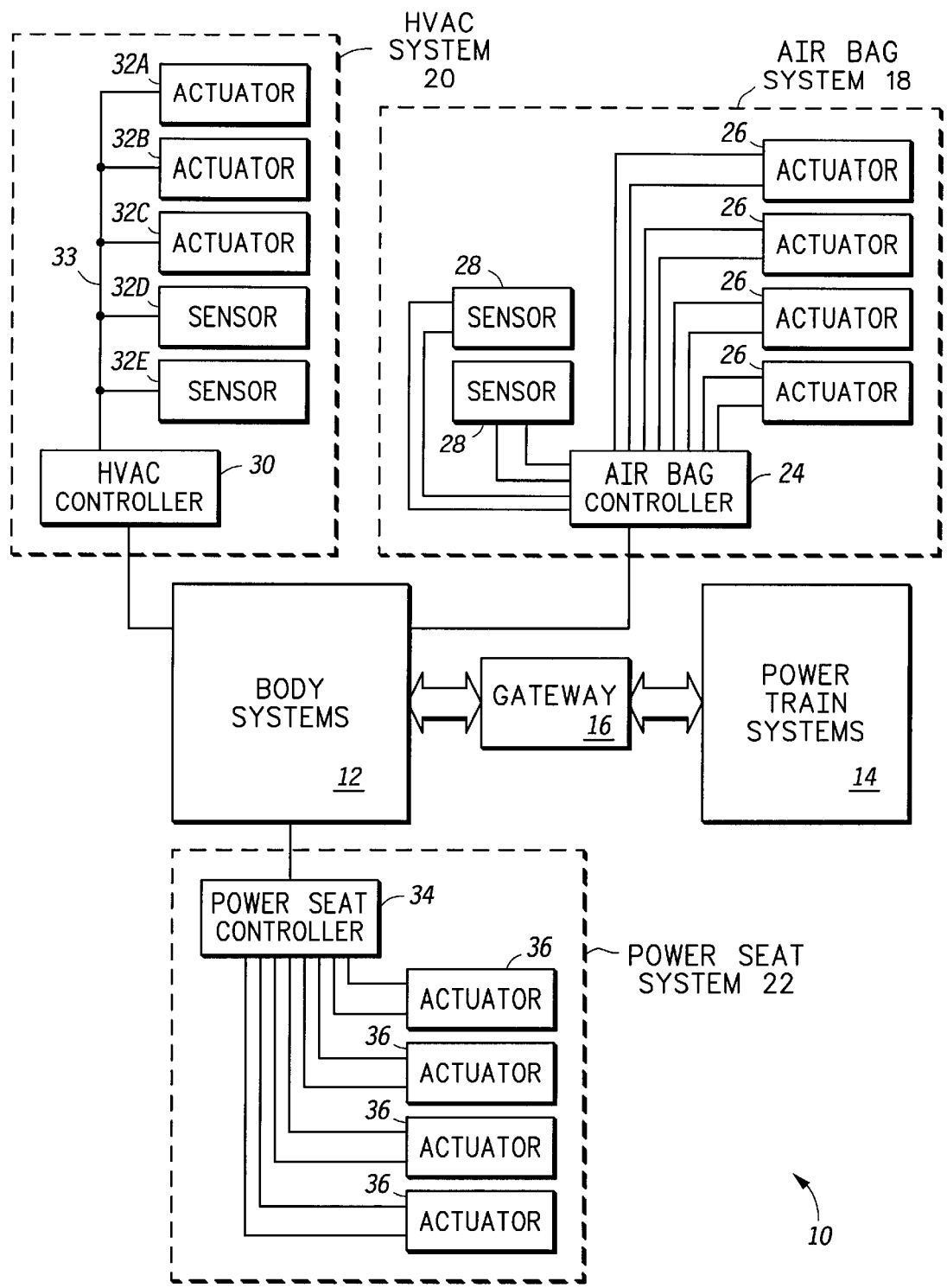
FIG. 1 illustrates, in a block diagram, a transportation electrical system containing many electrical subsystems configured in a manner which are known in the art.

FIG. 1 illustrates a conventional transportation electrical system 10. System 10 contains, by way of example, a body system 12, a power train system 14, with a gateway connection 16 allowing selective communication between the power train system 14 and the body system 12.

The body system 12 may contain any number of subsystems configured as discussed above. Three specific subsystems are illustrated in FIG. 1 as the air bag system 18, the heating ventilation and air conditioning (HVAC) system 20, and a power seat system 22.

In FIG. 1, the air bag system 18 comprises an air bag controller 24 for monitoring all sensors within the airbag system 18 and for controlling all actuators within the system 18. Airbag controller 24 is coupled to four, generic airbag actuators 26. Since each actuator 26 is generic, if all actuators 26 are coupled together on a common communication bus, a particular actuator 26 can not be uniquely selected to the exclusion of all other actuators 26. To overcome this, unique and exclusive line(s) are coupled between the airbag controller 24 and each actuator 26. By using separate conductive lines, the airbag controller 24 can control each actuator 26 independently of all other actuators 26. Also within system 18, airbag controller 24 is directly coupled to two, generic collision sensors 28.

The airbag system 18 requires a significant amount of wire for connection between the airbag controller 24, the actuators 26 and the sensors 28. This extensive amount of wire increases the cost of manufacturing and the weight of an automobile. The interconnect density available within a system, such as an automobile chassis, may prohibit such extensive wiring. New designs may require significant hardware changes, making reuse of the design difficult. A new design which adds functionality, such as additional sensors or actuators, may exceed the available pin count of the controller 24; adding additional pins would increase the cost of the controller 24.

As shown in FIG. 1, the system 10 also includes a distributed command and control system, HVAC system 20. HVAC system 20 includes an HVAC controller 30 and five actuators/sensors 32A, 32B, 32C, 32D, and 32E, connected to a common communication bus 33. When HVAC system 20 is fully assembled, the actuators/sensors 32A, 32B, 32C, 32D, and 32E are distinguished from each other, i.e. not identical. This may be done by using sockets which are physically or electrically distinct from each other, e.g., each socket may have different address pin connections, so that each of the actuators/sensors 32A–32E may be assigned a different address. When using this unique socket approach, human error during assembly could result in a non-functional HVAC system 20. In the alternative, actuators/sensors 32A–32E may be electrically programmed before assembly so that each of actuators/sensors 32A–32E has a different address. In this case, since actuators and sensors 32A–32E are no longer generic, five separate components must be tracked, stored, and coordinated by a transportation manufacturer. Therefore, the methodology illustrated in HVAC system 20 adds additional costs to the manufacturing process, and increases the risk of an improperly functioning HVAC systems via additional chance of human error. Repair, replacement, and redesign of systems containing these multiple different components is also more onerous.

FIG. 1 also illustrates a control and command system power seat system 22 which has a power seat controller uniquely coupled through separate lines to a plurality of generic actuators 36. In addition to the systems illustrated in FIG. 1, there are many subsystems and electrical architectures within any transportation design which could be optimized to reduce cost, reduce interconnection complexity, reduce weight, increase flexibility, reduce possibility of human error, and generally improve the overall performance of automobile electrical systems.

Figure 2:
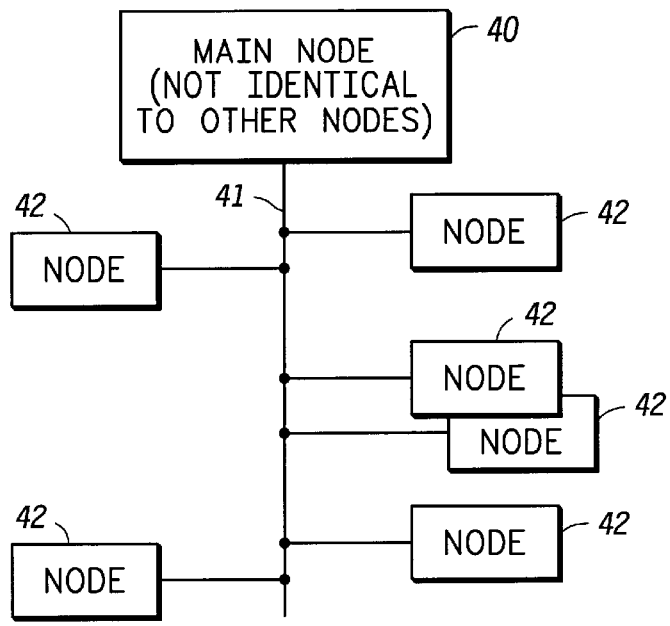
FIG. 2 illustrates, in a block diagram, a tree communication bus system which can be used to intercouple a plurality of generic nodes in a transportation system while achieving individual unique addressing of each node in accordance with the present invention.
Figure 3:
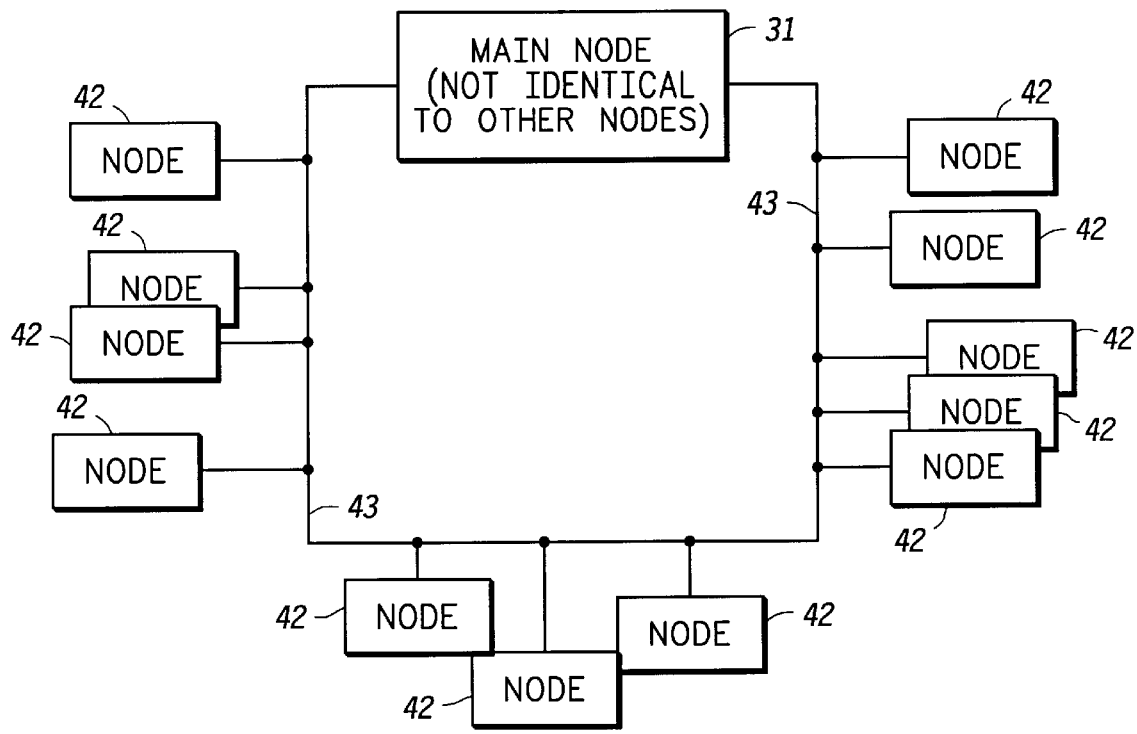
FIG. 3 illustrates, in a block diagram, a ring communication bus system which can be used to intercouple a plurality of generic nodes in a transportation system while achieving individual unique addressing of each node in accordance with the present invention.

Generally, the present invention is a method for interconnecting a plurality of generic nodes into a communication bus structure where the nodes are integrated circuits (ICs) and components, including CPUs, sensors, actuators, switches, or any other electrical, optical, or electromechanical device suitable for a transportation application. A main node or CPU of the system provides a unique address to each generic node. This addressing is done after assembly, in spite of the nodes being generic when first assembled into the system. According to one embodiment, the method and architecture discussed herein interconnects generic nodes in a tree structure (FIG. 2). Another embodiment interconnects generic nodes in a ring structure (FIG. 3). The present invention provides a method for distinguishing each of the generic nodes, where all nodes are interconnected along a single communication bus.

In the prior art, as in the HVAC system 20 of FIG. 1, the difficulty in addressing generic parts was overcome by making each of the actuators 32 a different part before assembly. Each of the actuators 32 were either electrically programmed or physically interconnected so as to distinguish one actuator from another actuator in system 20. The airbag system 18 of FIG. 1 illustrates an alternative method of differentiating generic nodes. Here each generic actuator 26 is uniquely addressed by an exclusive connection to central controller 24. However, this interconnection scheme significantly increases the cost of the system, increases the interconnection density within an automobile.

The system and method discussed hereinbelow connects a plurality of generic nodes together on a same communication bus. The connections are made at the point of physical assembly. During an initialization period, the method determines a distance for each node with respect to a main node. The determination may involve a measurement of voltage potential, current, optical measure, thermal measure, resistivity, or a change in a parameter, along the communication bus length to determine a distance of each node from a main node.

In a distributed control system having a control unit and at least one node coupled to a common communication bus, the distributed control system having a predetermined topology, when each node is a unique distance measured from a central controller along a communication bus, then that distance information provides a unique identifier. In one embodiment, the method of initializing addresses includes determining a distance from the control unit to each node, the distance representing a relative location of said node in the predetermined topology; and assigning a specific address to said node based on the relative location of said node in the predetermined topology. A measurement is made at each node and the measurement information is stored. The main node assigns an address to each node based on the measurement information. The measurement information may be adjusted to correct for errors. In this way, a subsystem having a plurality of generic nodes, such as those often used in transportation applications, is designed using a single communication interconnecting generic nodes.

The use of a single communication bus not only reduces manufacturing costs, but reduces interconnection density and results in a reduced weight of the automobile. Using such a design, the addition of new nodes to the system is easier to accomplish. In addition, it is possible to implement the design using generic nodes whereby parts are easier to track during manufacturing interchangable for repair and replacement. In addition, since all of the nodes connected to the communication bus are generic, human error resulting from the misplacement of a part into the system is eliminated. In summary, the use of a unique distance of each node to assign addresses within a distributed system offers significant advantages over the prior art. While automotive applications seem to be a first application, many other distributed systems may benefit from this technique, such as home wiring, telecommunications, etc.

FIG. 2 illustrates one type of distributed system having generic nodes which can be used in accordance with the present invention. The network of FIG. 2 is referred to as a tree network since the communication bus 41 is a single length of wire that does not close in on itself. FIG. 2 illustrates a main node 40 which may be an electronic control unit (ECU), a digital signal processor (DSP), a microprocessor, a microcontroller unit (MCU), a custom integrated circuit or any like central processing unit (CPU) or combination thereof. The main node controls the operation of the nodes 42 and coordinates communication among the nodes 42. In FIG. 2, the nodes 42 are all generic components, that are coupled to the central communication bus 41.

Typically nodes 42 are purchased as identical function parts. The central communication bus 41 may operate using any communication bus protocol containing one or more conductive lines, but preferably operates according to a transportation communication bus standard. The nodes 42 are generic devices that are indistinguishable from each other except for their position along the physical length of the communication bus 41. Note that it is possible to have multiple types of nodes along a single communication bus. The functionality of each of the nodes 42 within the system is determined by their position. For example, if an airbag system is configured as illustrated in FIG. 2, then each of nodes 42 may be an actuator at a specific location. In this case, the node 42 positioned in the driver's side airbag responds to a different stimulus than the node 42 positioned in the steering wheel airbag. The nodes 42 can be actuators, such as squibs used to fire airbags or electric stepper motors, sensors such as accelerometers or pressure transducers, communication devices, other microcontrollers (MCUs), DSPs, switches, or other nodes along any interconnected network.

FIG. 3 illustrates an alternate distributed system, referred to as a ring configuration, having a main node 31 connected to a communication bus 43 to form a ring. A plurality of generic nodes 42 are then coupled to the communication bus 43 as illustrated in FIG. 3. As in FIG. 2, the main node 31 is a central controller or some intelligent device that controls the operation of nodes 42 and/or monitors the nodes 42. The nodes 42 are all generic devices with the exception that; their physical placement onto the communication bus 43 is different for each node 42. Note that it is possible to have multiple types of nodes along a single communication bus. For example, it is foreseeable that actuators and sensors will be configured along a single communication bus.

In FIG. 2 and FIG. 3, the generic nodes 42 can be uniquely tagged or uniquely identified by discovering and utilizing their position, distance, or proximity along either the communication bus 41 or communication bus 43. As long as no two nodes are the same distance from the main node 40 and 50 along the respective communication buses 41 and 43, each node 42 can be individually identified and individually provided with a unique address so that each generic node within the systems of FIG. 2 and FIG. 3 can be uniquely and individually accessed to the exclusion of all other nodes. Furthermore, this address and the location of the node 42 in the system is typically associated with the function of that device in transportation applications. For example, the driver front airbag is probably the closest device to that main node 31 when the node 31 is located in the driver side of the dashboard. However, the collision sensor in the rear of the vehicle is probably farthest from this main node 31 within the driver side dashboard. Therefore, by knowing the topography of the design, the main node 31 will understand that the closest node it finds is to be addressed as the driver front air bag, and the farthest node it finds should be addressed and used as the rear collision detector for example. In summary, the distance of the node can be easily correlated to the function of that node if the main controller knows the layout or topology of the transportation communication bus design.

FIGS. 4–10 will illustrate: (1) how the designs of FIGS. 2–3 can determine the placement of generic nodes along one or more of the communication buses 41 and 43; and (2) how to assign the generic nodes unique addresses that indicate their function after their distance on the communication bus is determined.

Figure 4:
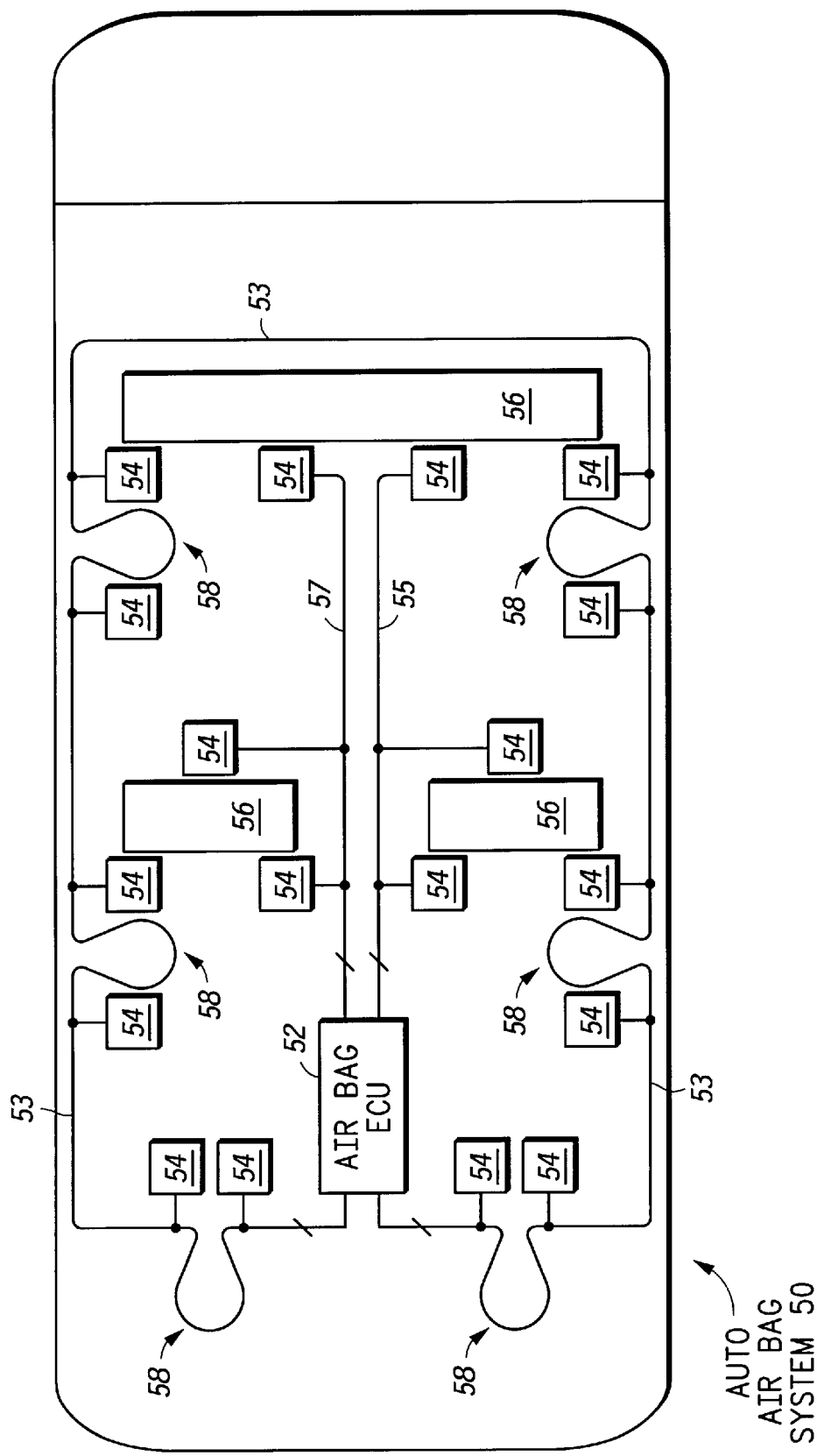
FIG. 4 illustrates, in a top down schematic diagram, an automobile airbag system 50 spatially oriented according to a layout of an automobile in accordance with the present invention.

FIG. 4 illustrates an automotive airbag electrical system 50 as it is physically placed around the chassis of an automobile. FIG. 4 illustrates the airbag electronic control unit (ECU) 52 which is analogous to the main nodes 40 and 31 of FIGS. 2 and 3 respectfully. The airbag, ECU 52 of FIG. 4 is coupled to one ring communication bus 53, as illustrated in FIG. 3, and two tree communication bus systems 55 and 57, as each are illustrated in FIG. 2.

Starting from the left hand side of FIG. 4 at the ECU 52 and moving clockwise along the ring communication bus 53, the ring communication bus 53 first interconnects to two actuators 54 which are analogous to the nodes 42 of FIGS. 2 and 3. The first two actuators 54 in FIG. 4 will control the deployment of a passenger front airbag. The two actuators 54 are used to operate a single airbag, where according to one embodiment, one triggers the air bag in response to a low speed collision while the other or both actuators are utilized in higher speed collisions. Here these actuators are separated by a wire loop 51.

As illustrated in FIG. 4, any number of actuators 54 are similarly separated by a wire loop 51. The loop of wire 58 adds length to the communication bus 53 to effectively increase the distance between the two closely spaced actuators 54; in this way the distance from ECU 52 to each node can be accurately measured and distinguished by ECU 52. Each actuator 54 may then be uniquely identified by a unique distance that is well outside the distance detection error of the electronic system incorporated within ECU 52. It has been experimentally determined, using current technology, that the loops 51 should ensure that at least roughly fifteen centimeters of wire separate any two adjacent communication bus-coupled actuators. This separation allows each actuator to be positioned having a unique distance from the controller; each actuator position is then uniquely discernible from all other actuator positions along communication bus 53. Other embodiments and other systems may incorporate any length of wire which allows each node to be distinguished, i.e. provide a minimum actuator to actuator distance greater than the error of the measurement and operation of the controller.

Continuing counter clockwise along communication bus 53, two actuators 54 separated by a loop of wire 51 are located at a middle top portion of FIG. 4 and: control one or more side airbags for the front passenger portion of the car. Continuing in a clockwise direction along ring communication bus 53, two actuators 54, separated by another loop of wire 51, are used to control a side airbag for a right rear passenger. Continuing clockwise along the communication bus 53 to a bottom portion of FIG. 4, the communication bus 53 couples to two actuators 54 separated by a loop 51 which will control one of more airbags for a left rear passenger. Still continuing clockwise, two or more actuators 54 and a loop of wire 51 between each closely spaced actuator will allow for control of a driver side airbag. Continuing clockwise back toward the airbag ECU 52, two final actuators 54 and another loop of wire 51 are used to operably couple the final two actuators to enable control a driver front airbag. As can be seen from FIG. 4 the actuators 54, the loops of wire 51, and the ring communication bus 53 implement a ring communication bus architecture as illustrated in FIG. 3.

FIG. 4 also illustrates tree communication bus structures 55 and 57, which are each coupled to the airbag ECU 52. The communication bus 55 controls a seatbelt pretensioner actuator 54 on both a front seat 56 and a back seat 56 and a front airbag for a left side back seat passenger. In the same manner, a tree communication bus structure 57 also controls two seatbelt pretensioner actuators 54 for the front seat 56 and back seat 56 as well as a second front airbag for the right side back seat passenger. These tree structures 55 and 57 are similar to the general tree structure illustrated in FIG. 2.

Returning to communication bus 53, the airbag ECU 52 will uniquely determine a position of each actuator 54 on the communication bus 53. The selective positioning of loops between actuators 54 provides additional distance between actuators which are spaced too closely to distinguish one from the other. ECU 52 has information regarding the predefined topology of the system. ECU 52 then assigns addresses to each actuator 54 based on its distance from the airbag ECU 52. Note that according to one embodiment, the distance is measured unidirectionally. Once a unique address has been provided to each actuator 54, each actuator 54 can be individually addressed, controlled, diagnostically tested, and monitored by the airbag ECU 52. The same is true for all actuators 54 along the tree communication buses 55 and 57. Once each actuator is uniquely located along a distance of these communication buses 55 and 57, the actuators 54 on these communication buses can be uniquely provided with a unique address and uniquely identified for subsequent operation, monitoring, and diagnostic servicing.

The automotive airbag application illustrated in FIG. 4 is an exemplar of a distributed command and control system incorporating the present invention. Both ring type and tree type systems are considered. Alternate embodiments may utilize the a combination of these types or may implement some other type of command and control distributed format.

Figure 5:
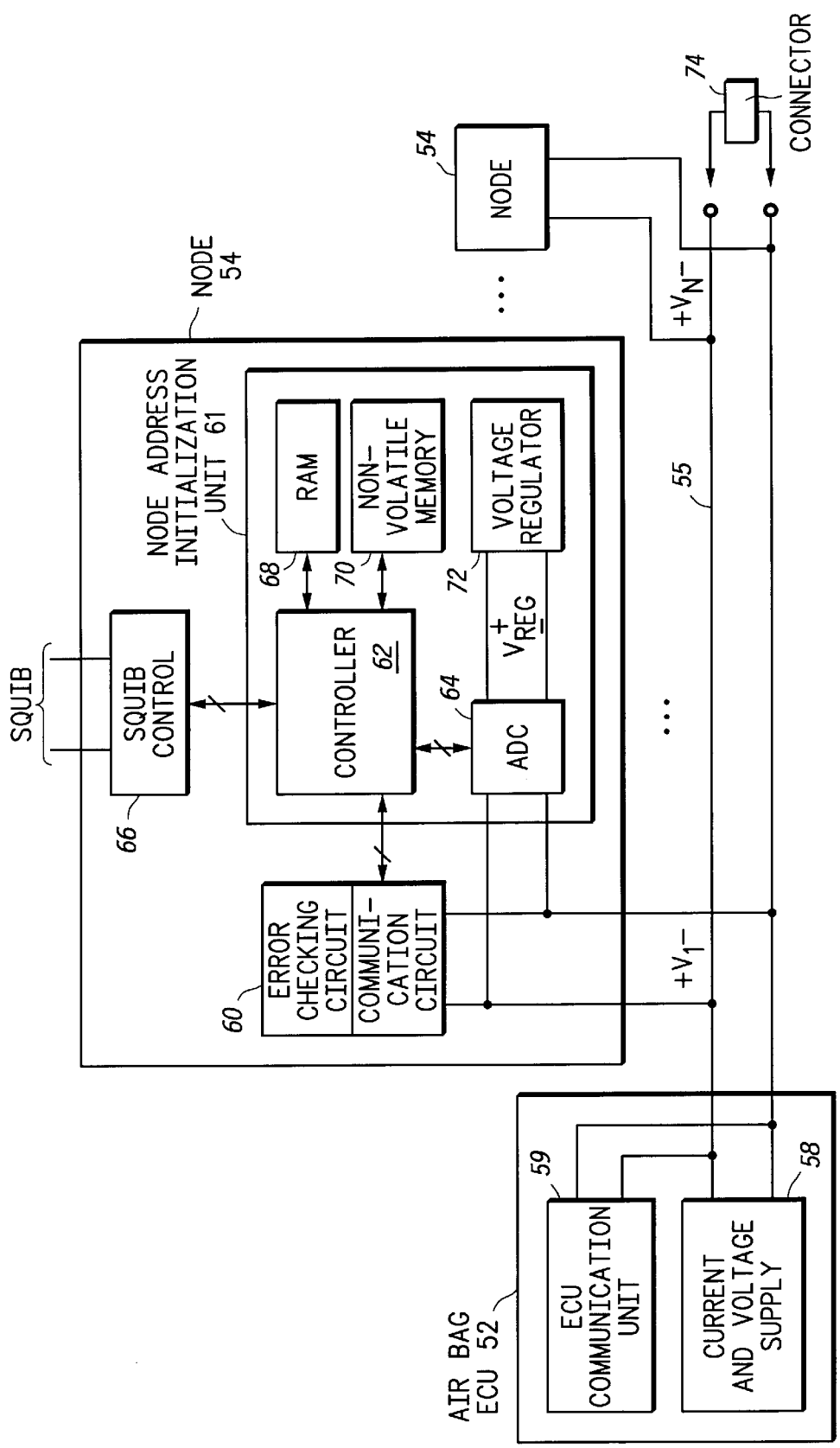
FIG. 5 illustrates, in a block diagram, a specific tree structure airbag automotive subsystem in accordance with the present invention.

FIG. 5 shows a more detailed illustration of a tree communication bus structure 55 or 57, including nodes 54 and ECU 52 of the air bag electrical system 50 of FIG. 4. More specifically, the air bag ECU 52 of FIG. 5 contains an ECU communication unit 59 and a current and voltage supply unit 51, each coupled to common bus 55. When the system of FIGS. 4 and 5 is first assembled, none of the generic nodes 54 within the system are uniquely tagged. Upon start up, the current and voltage supply unit 58 is used to identify the distance of each node 54 along the communication bus interconnection 55 or 57. The ECU communication unit 59 will then provide a unique address to each node 54 on the common bus 55. After provision of these unique addresses to the nodes 54 during a normal mode of operation is free to commence, where each node is accessed by address. In a normal mode of operation, control information, monitoring information, and diagnostic information can be uniquely tagged and communicated to individual nodes 54 connected to the common bus 55, even though each node 54 attached to common bus 55 was an indistinguishably generic structure to all other nodes 54 when first installed into the transportation system.

According to one automotive airbag embodiment, each node 54 in FIG. 4 and FIG. 5 includes a communication circuit and an error checking circuit 60, such as a cyclical redundancy code (CRC) check unit. Each node also contains a node address initialization unit 61, and a squib control unit 66. The communication circuit unit 60 will allow information to be communicated bidirectionally between the node 54 and the ECU communication unit 59 as previously discussed. When the system of FIG. 5 is in an initialization mode of operation, the communication circuit unit 60 can provide derived digital serial distance data to the ECU communication unit 59. In addition, the communication circuit unit 60 will receive and properly route the unique address communicated from the ECU communication unit 59 to the node 54 in response to its communication of its distance data. Furthermore, during normal mode of operation data, address, and CRC data is serially latched as input and latched for serial output by the interface 60. Minimally, the communication circuit 60 generally has a serial shift register for capturing addressing bits, a serial shift resister for data capture once properly addressed, and a data register for providing serial data output to the communication bus (may be same as data capture register). During normal mode of operation, an error checking circuit, such as that illustrated with communication circuit 60, or a CRC check or any other type of error detection and/or correction circuit is used to ensure that errors in the transmission between the air bag ECU 52 and a node 54 do not result in erroneous operation of the air bag safety system (e.g., triggering of the air bag when there is no accident).

The analog distance determination circuitry 61 contains a controller 62, random access memory (RAM) 68, nonvolatile memory portion 70, an analog-to-digital (A/D) converter 64, and a voltage regulator 72. The controller 62 generally controls the operation of the node 54 (e.g., whether the node is in the normal mode of operation or the initialization mode of operation). When the node 54 is first powered on, the controller 62 informs the A/D converter 64 that the initialization mode of operation is beginning. During the initialization mode of operation, the current and voltage supply unit 58 will provide voltage and/or current signals along the communication bus 55 which will allow the A/D converter 64 to derive certain digital values over time. Note that during the initialization process, the connector 74 is temporarily coupled to the communication bus 55 to short circuit or "close-loop" the communication bus for the current-driven distance determination of the initialization process (see FIG. 7). These certain digital values are provided to the RAM 68 via the controller 62. The specific determination and provision of these digital values and their significance to determining the distance on the communication bus 55 are discussed in more detail with respect to subsequent FIG. 7.

Once the specific digital distance values are stored within the RAM 68, the controller 62 will then provide these distance values back to the ECU communication unit. 59 via the communication circuit 60. Once the ECU unit 52 has received all of the distance information from all of the units 54, the ECU 52 will then provide addresses from the unit 56 to all of the controllers 62 within each node 54 of the system of FIG. 5. Each node 54 will be uniquely tagged by the ECU communication unit 59 during this unique address provision operation by using the distance values that the controller 62 previously stored into RAM 68 as a unique identifier. In other words, each node 54 within the system of FIG. 5 will have different distance values stored in RAM 68 whereby these difference distance values may be used to address an individual node 54 to the exclusion of all other nodes 54 during the address initialization process. Once a node 54 has been uniquely identified by the re-transmitted distance values from the unit 56 to the nodes 54, the ECU communication unit 59 will provide a unique address value which the communication circuit 60 only of that selected node 54 will accept. That controller 62 will provide the respective unique address to the nonvolatile memory portion 70 of FIG. 5. Each of the nodes 54 are serially provided with a unique address in this manner.

The nonvolatile memory 70 is one or more of ferroelectric embedded DRAM, electrically erasable programmable read only memory (EEPROM), or like nonvolatile storage devices. Once an address is obtained for use within the nonvolatile memory 70, the A/D converter 64 is informed by the controller 62 to deactivate, and the entire system of FIG. 5 is now capable of entering a normal mode of operation with full addressing capability. In the normal mode of operation, the ECU communication unit can provide packets of information containing an address, data, and error checking information to the communication bus. Only the single node 54 which is uniquely tagged by the packet as can be determined by comparing the packet address to the nonvolatile memory contents will process the data information. Therefore, every generic node 54 within the system of FIG. 5 can be uniquely tagged by using the architecture illustrated in FIG. 5.

Figure 6:
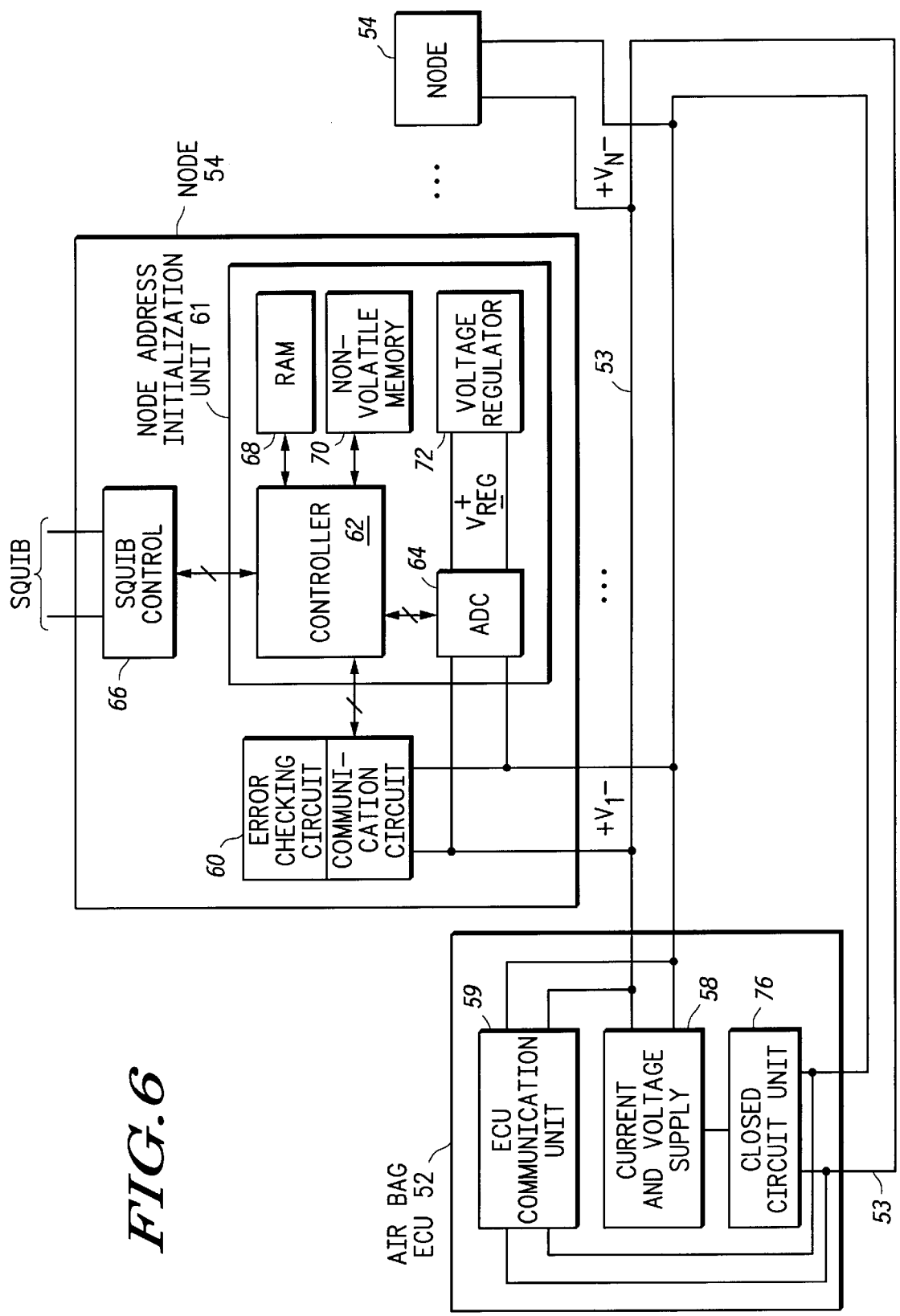
FIG. 6 illustrates, in a block diagram, a specific ring configured airbag automotive system in accordance with the present invention.

While FIG. 5 illustrates the tree structure of communication buses 55 and/or 57 of FIG. 4, FIG. 6 illustrates the ring structure of communication bus 53 from FIG. 4. Generally, the architecture of FIG. 6 is analogous to the architecture of FIG. 5 with some minor changes. FIG. 5 relies on ,an externally attached connector 74 in order to short the communication bus 62 of FIG. 5 in order to perform current-based distance detection operations. In FIG. 6, due to its ring architecture, a switch unit 76 is used in air bag ECU 52 in order to close the loop on the communication bus 53. Closed loop operation is needed within the system during the initialization period as will become evident after the discussion of FIGS. 7–8.

Figure 7:
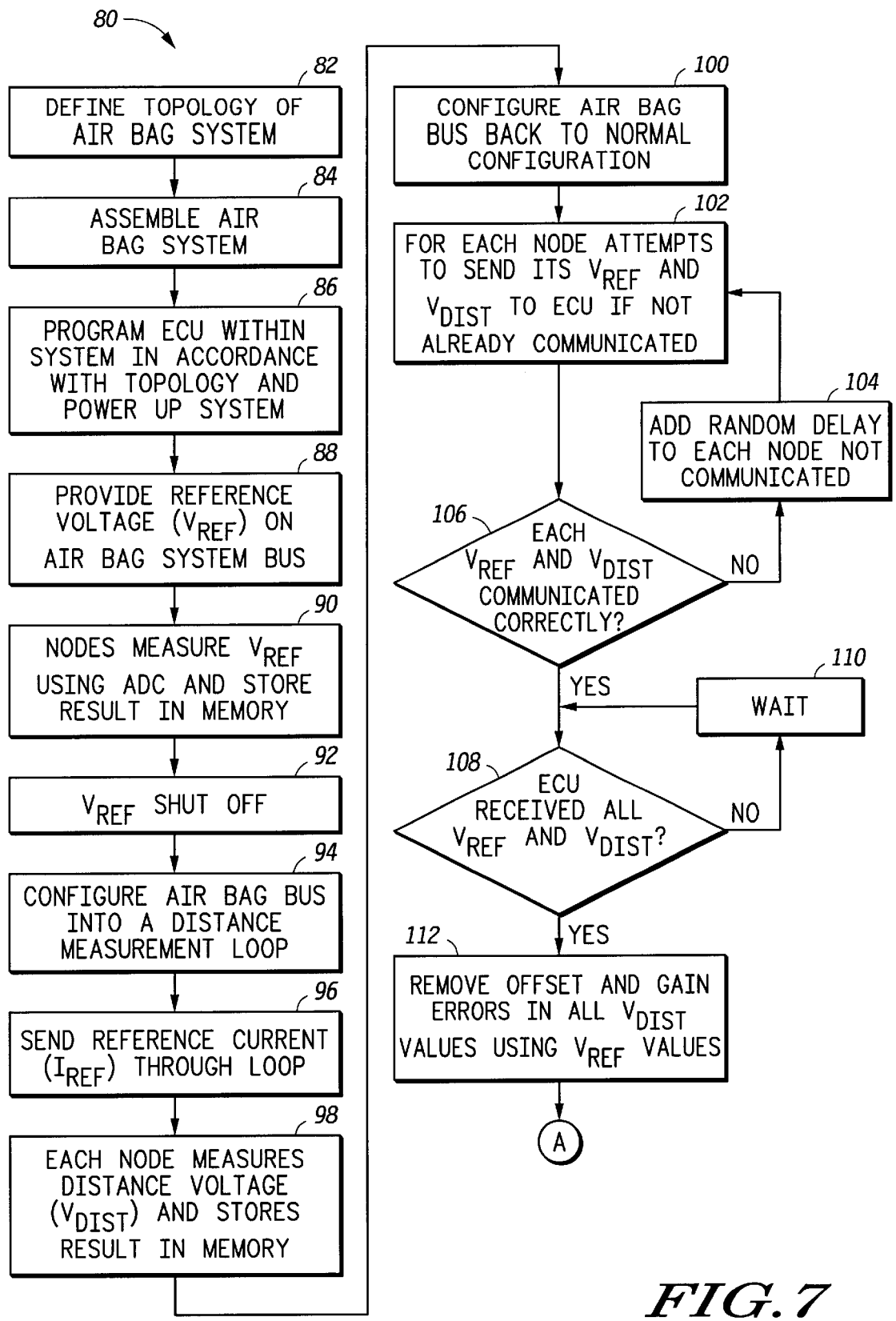
FIGS. 7–8 illustrate, in an interconnected flow chart, a method for configuring the nodes of FIGS. 4–6 with unique addresses in accordance with the present invention.
Figure 8:
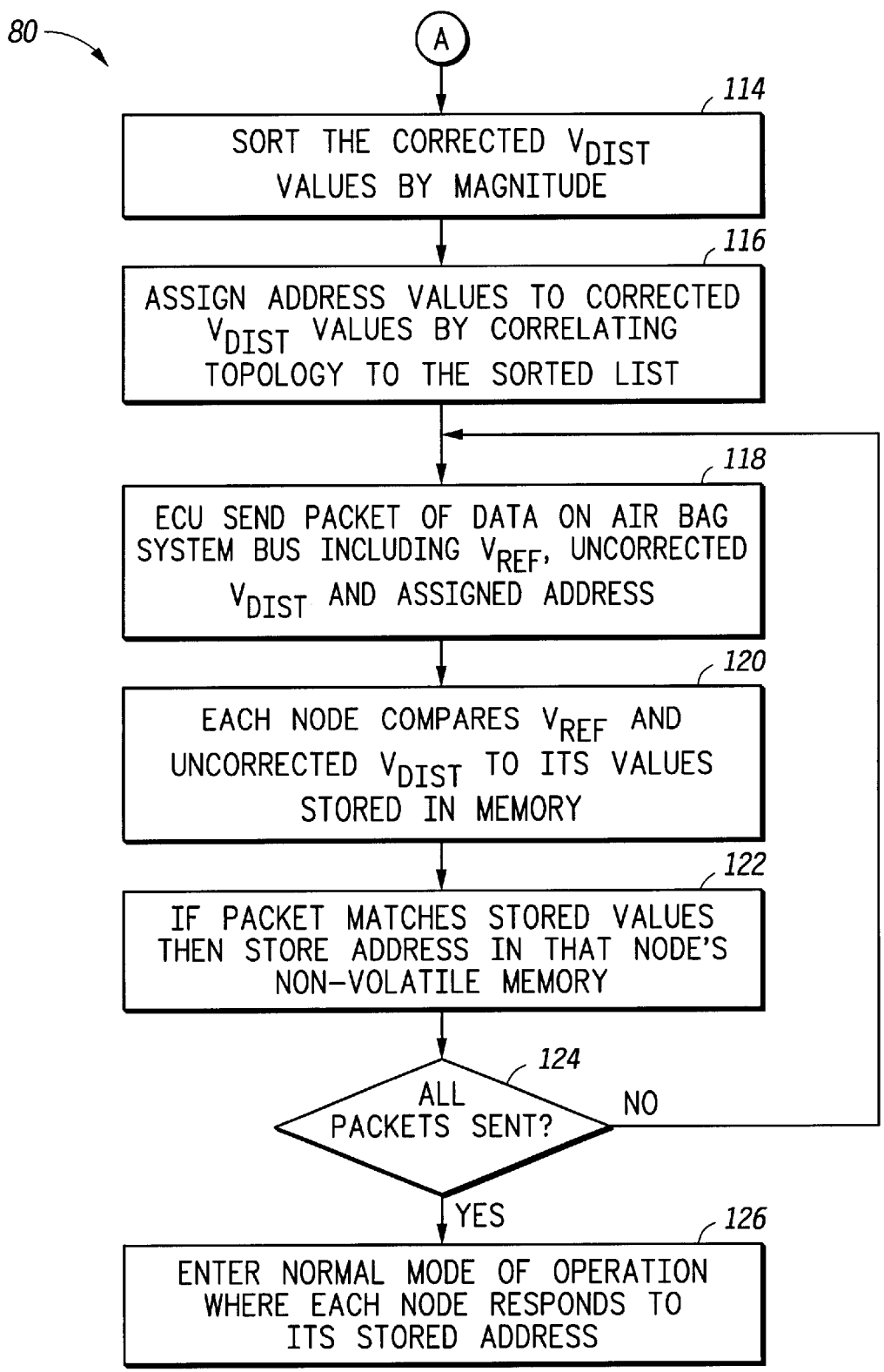

FIGS. 7–8 illustrates a interconnected flowchart which teaches a methodology to initialize the structures of FIGS. 5 and/or 6. Generally, FIGS. 7–8 illustrates a technique by which voltage and current processing can be used to identify a physically unique distance of each node 54 along a communication bus structure 53 or 55. Once this distance is determined for each node 54 by the nodes themselves, the distance value(s) are communicated from the nodes 54 to the air bag ECU 52. This distance information is processed by the ECU 52 whereby each unique distance is assigned to a unique address. These unique addresses are then provided to each node 54 where the nodes are addressed to provide these unique addresses via their unique distance information that was previously transmitted by the nodes 54. Once each node 54 receives its unique address, the unique address is stored in nonvolatile memory (NVM) for permanent addressing use within the node. At this point in time, all otherwise generic nodes 54 have been provided with a unique address whereby normal operation may commence with each node 54 being uniquely addressable within the communication bus system.

The method of FIGS. 7–8 begins in FIG. 7 by defining a topology of the air bag system in a step 82. In other words, an automotive designer will define the number of actuators coupled to each communication bus, the type of communication bus architectures used (either ring or tree or both), and the function of the actuators on each communication bus according to the actuator's position/distance along the communication bus length (e.g., the closest actuator is a front air bag, a middle actuator is a front seat pretensioner, and a farthest actuator on the communication bus is a collision accelerometer to detect an auto accident). Defining the topology before assembly, initialization, and operation of a transportation system is important since certain parameters of the software within the ECU 52 must be programmed according to the topology in order to enable proper initialization and operation. For example, for initialization purposes, it may be advantageous for the ECU 52 to know exactly how many nodes 54 are attached to its communication bus. Once the specific number of nodes attached to the communication bus is understood, the ECU 52 can perform more efficient initialization operations without missing the address initialization of some important nodes. Furthermore, once the ECU 52 determines that there are N nodes rank-ordered in distance from 1 . . . N, it would be useful for the ECU 52 to know what function is performed by each actuator in each relative position. Knowing what is the closest actuator and the farthest actuator does little good if the system does not know which actuator's position represents the passenger airbag squib and which actuator position represents the driver airbag squib. In all circumstances, the changes to the software within ECU 52 that are required to implement different topologies is minimal and is usually only a change in one or a few variables within the ECU 52 software.

After the topology of the air bag system has been defined in step 82, the air bag system is assembled via step 84. In other words, step 84 will assemble the actuators 54, main node ECU 52, and wiring into an electrical system as illustrated in one or more of FIGS. 2 through 4. Once the system has been assembled in step 84, the ECU 52 is programmed in accordance with the topology from step 82 in a step 86. In step 86, the ECU is programmed in accordance with the topology of step 82 to allow for efficient initialization and operation of the system as previously discussed. For example, the ECU 52 may be told that there are six actuators in the communication bus system wherein the two closest actuators are the front passenger air bags, the next two closest actuators are side air bags and the last two closest actuators are seat belt restraint devices for the back seat. Knowing the number of actuators in the system and their desired operation as a function of distance along the communication bus will allow the ECU to perform efficient and correct initialization operations on these generic actuators. In addition to programming of the ECU 52, power is provided to all of the actuators, communication buses, and ECU devices within the system via step 86.

In step 88, the current and voltage supply 58 within FIGS. 5 or 6 will provide a reference voltage (Vref) along the respective communication bus 53 or 55 that requires initialization. At this point in time, the connector 74 of FIG. 5 is not attached to the system and the closed circuit unit 76 of FIG. 6 is controlled so that the end of the ring communication bus 53 in FIG. 6 is disconnected. When in this state, the reference voltage provided in the communication bus should be the same voltage provided to all of the nodes 54 within the system, assuming no significant current loss due to leakage current (which is a safe and accurate assumption for the method of FIG. 7). With little or no leakage currents, the voltage VI and the voltage VN respectively across all N of the nodes 54 coupled within the systems of FIGS. 5 and 6 should register the same input voltage where V1=V2= . . . =VN=Vref as provided by unit 58. Since the nodes 54 have just been powered on, the controller 62 of FIGS. 5 and 6 informs the A/D converter 64 that the initialization mode is now beginning. The A/D converter will convert the reference voltages (V1 . . . VN) for each node into a digital voltage reference (Vref) value and store this digitally converted result within RAM 68 through the controller 62. Therefore, each of the N nodes in FIGS. 5 and 6 will be able to store a digital equivalent of their respective input reference voltage value within RAM 68.

The digital Vref value stored within each RAM 68 in each node 54 serves a very important function. Even though the analog Vref voltage applied to each node 54 is equal or nearly equal, each A/D converter 64 and each voltage regulator 72 within each node is an imperfect mismatched analog device. The A/D converter 64 and the voltage regulators 72 will vary from node-to-node, will vary with different temperatures, and will have inherent nonlinearities which may render each node 54 slightly different from all other nodes 54. In order to remove this nonlinearity and inherent error from the system, the reference voltage (Vref) is used in the methodology of FIG. 7. The digital Vref value stored in the RAM unit 68 will allow the ECU communication unit 59 to subsequently remove any nonlinearity from the system whereby any nonlinearity in one node (which may adversely affect the determination of its position) can be effectively removed as a concern via ECU 52 whereby the distance determination of each node within the system is rendered much more accurate. Therefore, step 90 of FIG. 7 stores a digital Vref value into RAM location 68 of each node or distance error correction purposes.

After step 90, a step 92 will signal the end of the Vref recordation phase, e.g. by shutting off the supply of the voltage reference signal from the current and voltage supply 58. This Vref termination period is performed to communicate to all the nodes 54 that the digital Vref recordation portion of the initialization algorithm has terminated. Typically, enough time is provided in step 90 to ensure that all nodes 54 have adequately processed and stored a digital Vref value before Vref is shut off in the step 92.

In step 94, the air bag communication bus 53 and/or 55 is configured to perform a distance loop measurement using a sourced current provided as output from the current supply 58. In the case of FIG. 5, the required closed loop configuration is enabled by providing a connector 74 across the communication bus 62 to short both signals of the communication bus 62 together to form a loop structure. Connector 74 may be as simple as a resistive device or loop of wire, but 74 may also contain sophisticated diagnostic electronics. If more than two communication bus signals are provided, the loop need only close circuit any two signals (e.g., power and ground, signal and ground, signal and power, etc.) that connect to each and every node on the communication bus). For the ring configuration of FIG. 6, the step 94 of FIG. 7 is accomplished by informing the circuitry within unit 76 to short both signals of the ring communication bus 53 together with one another through an optional resistance device. Therefore, in step 94, one of either the externally attached connector 74 or the internally controlled unit 76 forms a closed loop connection on its respective communication bus structure.

Once a closed loop connection is formed on the communication bus in step 94, the current and voltage supply unit 58 will communicate a fixed reference current (I) unidirectionally through the closed loop communication bus 53 or 55 in one or more of FIGS. 5 and 6. Since the communication bus has a resistance value per unit length, the resistance experienced by each node via the communication bus connection is linearly proportional to the distance of wire connected between the unit 58 and the node 54. In other words, nodes 54 that are closer to the current and voltage supply unit 58 along the communication bus 53 or 55 will experience a different voltage than those nodes positioned far away from the current and voltage supply unit 58. As a specific example, the voltage V1 in FIG. 5, which is a differential node voltage physically closest to the current and voltage supply unit 58, may have a differential voltage value of 100 millivolts (mV) whereas a node 54 located farthest away from the current and voltage supply unit 51 may have a differential VN of roughly 15 millivolts (mV). These different voltages experienced by each of the nodes are called the node's respective distance voltage or Vdist. Any of the nodes lying between the closest node 54 and the farthest node 54 will have some different Vdist voltage value proportional to communication bus distance where Vdist is somewhere between the high and low values of 100 mV and 15 mV for the above example.

In a step 98, the controller 62, in response to the signaling from steps 92–94, waits for a settling time and then informs the analog to digital converter 64 in its respective node 54 to record the converted value of this analog distance voltage (Vdist) and store the resulting digital distance voltage (Vdist) within the RAM 68 along with the previously stored digital Vref value. Therefore, the node 54 closest to unit 58 will store a digital Vdist value analogous to 100 millivolts in the RAM 68 whereas the farthest node 54 within the system will record a digital Vdist value analogous to 15 millivolts within its RAM 68. Note that two closely-coupled adjacent nodes along the communication bus may differ in Vdist only by a few millivolts. In these cases, the nonlinearity, process differences, and like inherent variations between the analog circuitry in the nodes 54 may result the closest node reading 50 mV and the farthest node reading 51 mv erroneously (remember that in the specific embodiment of FIGS. 5–6 that the closer node should have a greater Vdist than the farther node). However, this error in Vdist can be quantified by the Vref values where the Vref values may be used to "correct" any erroneous Vdist values into their "true" or "corrected" Vdist values. The combination of the Vref value and the Vdist value within each RAM 68 will allow each node 54 to be uniquely identified by the ECU communication unit 59 since no two nodes will have the same Vdist and Vref values. In other words, the combination of the Vref and the Vdist values within the nodes 54 will allow the ECU unit 56 to accurately organize the nodes 54 in accordance with their respective distances along the communication bus and will allow the ECU unit 56 to uniquely identify each node in the system.

In one form, the Vref and Vdist values may be processed by the individual nodes to create a unique processed value wherein these unique processed values become the unique address for each node. The ECU may then be told what the addresses are once the nodes assign the unique addresses to themselves. In another form, the Vdist and Vref values are communicated to the more powerful ECU 52 so that the ECU can mathematically process the Vdist and Vref values and provide a unique address to each node using a recommunication of the Vdist and Vref values as a unique node identifier. This second form is further illustrated in the remaining steps of FIG. 7.

After a sufficient amount of time has passed for each node to perform the proper processing within step 98, a step 100 commences. In step 100, the connector 74 of FIG. 5 is removed from the communication bus 55 and/or the unit 76 of FIG. 6 is disabled to return the communication buses 53 and/or 55 to the normal open loop configuration. In addition, the current and voltage supply 58 is disabled and decoupled from the communication bus 53 and/or 55 in step 100. In essence, the air bag communication bus is converted back to a normal configuration to allow each node 54 to communicate the Vdist and Vref values from each of the RAMs 68 to the ECU communication unit 59 via the communication circuit 60 in each node 54. Note that communication circuit 60 may include a serial communication unit or any other type unit adapted for communication on a common bus.

This communication of Vdist and Vref values from nodes 54 to the ECU unit 52 commences via a step 102 in FIG. 7. In step 102, each node sets a random time at which to begin transmitting the Vdist and Vref values from its RAM 68 to the ECU communication unit 59. In order to enable such communication, each node 54 waits a random amount of time that likely different for each node, and then provides the Vdist. and Vref values from the RAM 68 to the communication circuit 60 via the controller 62. In other words, each node sets a random time in a counter and times out the counter using this random time (note that each random time should statistically be different in all nodes most of the time, however, when two times are too close, equal or overlap, collisions can be compensated for using the techniques outlined below). Once the random time has timed out within a specific node 54, that specific node's communication circuit 60 will begin providing the Vref and Vdist information serially to the ECU communication unit 59. The ECU communication unit will use CRC check sum processing on all information provided from each node 54 to ensure proper receipt of the Vref and Vdist information for each node 54. The node 54 itself can determine if the information was properly communicated by monitoring the communication bus 53 and/or 55 for communication bus contention via the communication circuit unit 60. If the communication circuit 60 of the transmitting node 54 senses no communication bus contention and the ECU communication unit 59 performs proper CRC check sum calculations, then the information was properly communicated from that node 54 to the communication unit 59 in step 102 and no retransmission is needed for initialization.

However, some collisions in transmission between two or more nodes may statistically occur on occasion. For this reason, the ECU communication unit 59 and the communication circuit unit 60 are constantly checking the communication bus 53 and/or 55 for communication bus contention during step 106. If one or more nodes 54 detect a collision during transmission of the Vref or Vdist values, then each of the nodes which experience a collision will generate another random delay time (see step 104) and then attempt to recommunicate their Vdist and Vref information once again after that additional random interval has expired. While it is uncertain and random as to how many collisions will occur per initialization, conventional statistical analysis indicates that all of the nodes 54 will be able to randomly communicate their Vdist and Vref information without collision or error to the ECU communication unit 59 in a reasonable amount of time far less than one second.

The ECU communication unit 59 understands the topology of the system as defined in step 82. Therefore, the ECU communication unit 59 knows how many nodes 54 are in existence on the communication bus 53 and/or 55. Therefore, the ECU communication waits the proper random time period until all combinations of the Vref and Vdist values for all N nodes are properly received. If the ECU 52 receives less than N correct transmissions for the system, then noise may have causes a failure without a node noticing the communication bus contention or error whereby retransmission of all nodes must commence again until all N nodes are received in any random order without CRC error.

After this random interval, which is a function of communication bus contention and noise errors, the ECU communication unit 52 is assured that all Vref and Vdist pairs of digital data have been received for processing. Therefore, steps 108 and 110 are performed by the ECU communication unit 59 until all N pairs of valid Vdist and Vref information is entirely received by the unit 56. Once all N Vref and Vdist pairs are received for all N nodes 54 within the system, a step 112 is performed in FIG. 7. In step 112, mathematical computations are performed by the unit 56 using the Vdist and Vref values in order to remove voltage variation, performance variation, process variation, A/D nonlinearity, and other erroneous and/or inherent errors/differences from the original Vdist data to result in corrected Vdist data.

After such corrective. mathematical calculations are performed, a step 114 is performed in FIG. 8. In step 114, the ECU communication unit 59 will sort all of the corrected Vdist values by magnitude from greatest to least or from least to greatest. Since the ECU communication unit 59 was informed of the topology of the system in step 82, the air bag system knows which device is supposed to be the closest device in the system and the function it performs, which device is to be the next closest device in the system and the function it performs, and so on until the last closest device in the system is identified by position and function. In summary, after the sorting is performed in step 114, the ECU 52 can determine which nodes 54 are to get which addresses (see step 116), and the unit 52 can determine the function that is performed by each addressed node 54 in the system given its distance along the communication bus 53 and/or 55.

Therefore, once the corrected Vdist values are sorted by magnitude, a step 116 is performed in FIG. 8 to assign unique addresses to each node 54 according to function and/or distance. In step 118 of FIG. 8, the ECU communication unit serially communicates the Vref and Vdist pairs of values out along the communication bus 53 or 55. These Vref and uncorrected or original Vdist values are captured by all the communication circuits of all the nodes 54. Only one node 54 among all the nodes 54 will have received Vref and uncorrected Vdist values that matches the information it has previously stored in its RAM 68 (see step 120). This one node 54 is then on notice by its controller 62 that it must receive the following transmitted unique address to the exclusion of all other nodes 54. A unique address follows the uncorrected Vdist and Vref information, and only that one node 54 which is identified by the Vdist and Vref values will accept the unique address via its communication circuit 60 (see step 122). In a step 122, only the nonvolatile memory 70 of the selected node 54 is written with the unique address.

The steps 118 through 124 are repeated N times until all N unique addresses are properly sent and CRC checked to all N nodes connected to the respective communication bus. Any nodes that experience a failure in the address CRC operation may communicate to the ECU 52 its Vref and Vdist information once again at a later time to flag such an error to the ECU 52. Once the CRC error is flagged for that one node 54, the ECU may transmit the unique address once again (along with Vref and the original Vdist as needed) until all unique addresses are properly stored in NVM 70 by the nodes 54. After all of the units 54 have been provided with a unique address with proper CRC checking, the unique address is respectively stored in the nonvolatile memory 70 of each node 54. After NVM storage of the unique address, normal mode of operation may begin whereby the transportation system can use the ECU unit 56 to uniquely identify any of the generic nodes 54 within the subsystem for operation, later re-initialization, diagnostic monitoring, and the like.

Figure 9:
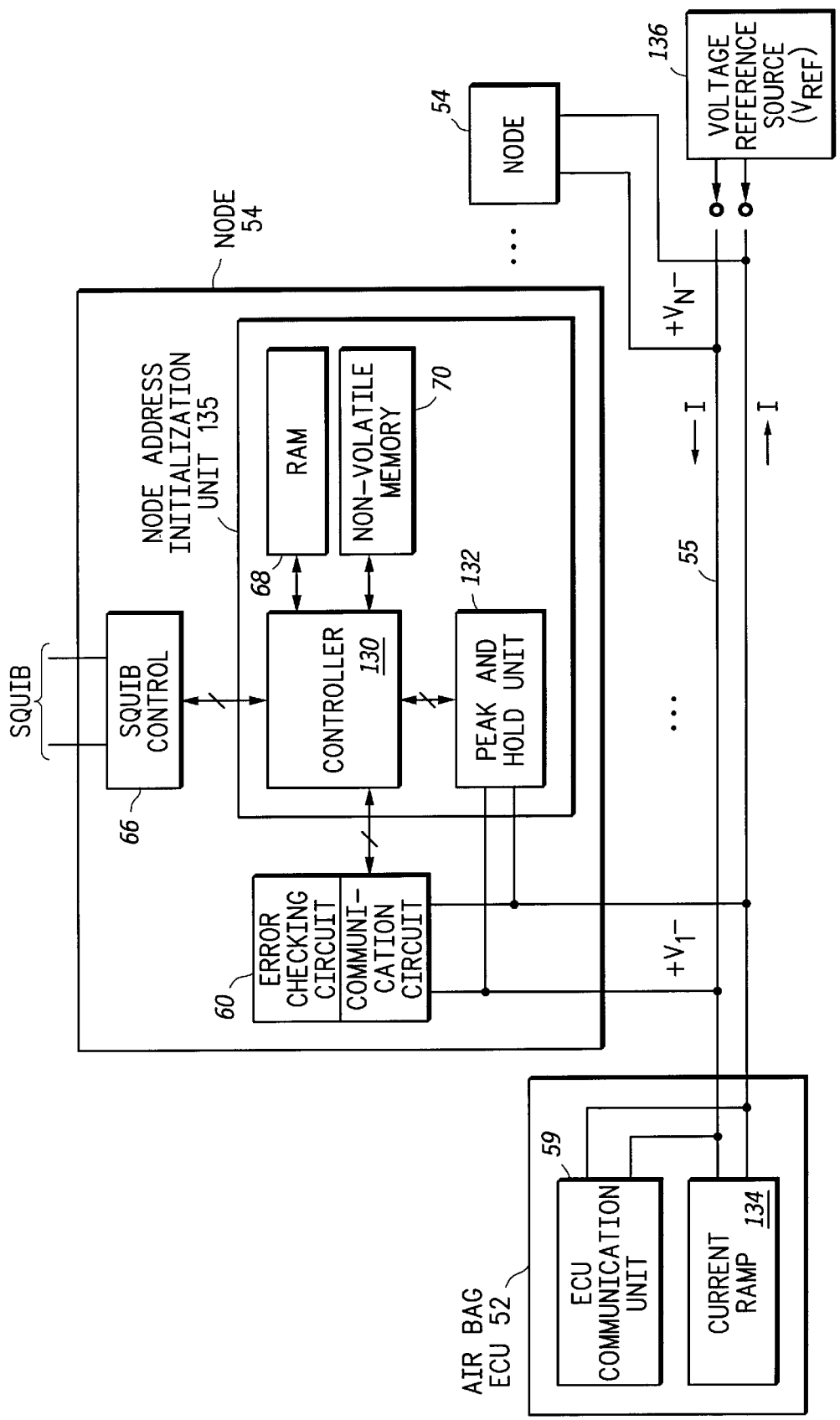
FIGS. 9 and 10 illustrate, in block diagrams, respective alternate embodiments for the systems previously illustrated in FIGS. 5 and 6 in accordance with the present invention.

FIG. 9 illustrates an alternate embodiment to the 10 communication bus structure illustrated in FIG. 5. All of the elements in FIG. 5 and FIG. 9 that are generic or substantially similar in structure and/or function are indicated by generic reference number. One primary difference between a FIG. 9 and FIG. 5 is that the current and voltage supply 51 of FIG. 5 is replaced with a current ramp supply 134 in FIG. 9. In addition, the externally attached connector 74 of FIG. 5 is replaced with a much more complicated externally-attached reference voltage source (Vref) 136. In addition to these differences, .the analog distance determination circuitry 61 of FIG. 5 is different from the node. address initialization unit 135 of FIG. 9. In FIG. 5, the unit 61 utilizes an A-D converter 64 during initialization in order to uniquely determine a physical position or distance of the node 54 along the length of the communication bus 62. In FIG. 9 a peak and hold unit 132 replaces the voltage regulator 72 in the A-D converter 64 of FIG. 5. According to alternate embodiments a sample and hold unit may be implemented.

While the structural differences between FIG. 5 and FIG. 9 seem slight, the differences resulting in the methodology are significant. Unlike FIG. 5, in FIG. 9, the reference voltage source 136 will provide a reference voltage (Vref) along the communication bus 62 and the current ramp 134 will be providing no current. At this point, each node 154 will store a trigger voltage within a capacitor in the peak and hold unit 132 which is proportional to the reference voltage provided by unit 136. Therefore, each node 54 will store roughly the same trigger voltage within its respective unit 132.

At this point, the current ramp circuitry in circuit 134 will begin to ramp the current from zero amps up to some predetermined amperage level. Since the resistive length of communication bus exposed to each node 54 is different, the differential voltage values V1 through VN across each node 54 will change at a different rates as the current linearly ramps. In other words, nodes experiencing more communication bus resistance length will change in voltage faster and those nodes experiencing less communication bus resistance whereby the voltages V1 through VN across the nodes will begin to diverge/spread as the current ramp progresses. In one embodiment, the voltage V1 will reach the trigger voltage before any of the other node voltages V2–VN reaches the trigger voltage. At this point, the peak and hold unit 132 will notice that the trigger voltage was reached for this first V1 node 54 and notify the controller 130 of this event. This controller 130 of the first V1 node 54 will then send a signal to the ECU. One method to send this is to short the communication bus 62 through the communication circuit unit 60 whereby the ECU communication unit 59 will sense the electrical short-circuiting change on the communication bus.

At this point, the current ramp operations via the unit 134 will cease and the ECU communication unit 59 will transmit a unique address value to the selected V1 node 54 for storage in its nonvolatile memory location 70. After receipt of a valid address as verified by a CRC operation, the controller 130 of that selected node 54 will terminate its peak and hold unit connection to the communication bus and cease participation and any further current ramp operations. The next current ramp operation is then progressed with the most-recently programmed node and all previously address-programmed nodes not participating in the ramp operation. Due to the exclusion of all previously addressed nodes in this new current (I) ramp, the next ramp operation will detect the next farthest node in the system where its voltage Vn (n being an integer number between 1 and N) reaches the trigger voltage in the peak and hold circuit 132. This serial triggering of one node at a time continues until all nodes 54 within the system are serially programmed with an address based upon the nodes position/distance along the communication bus.

Figure 10:
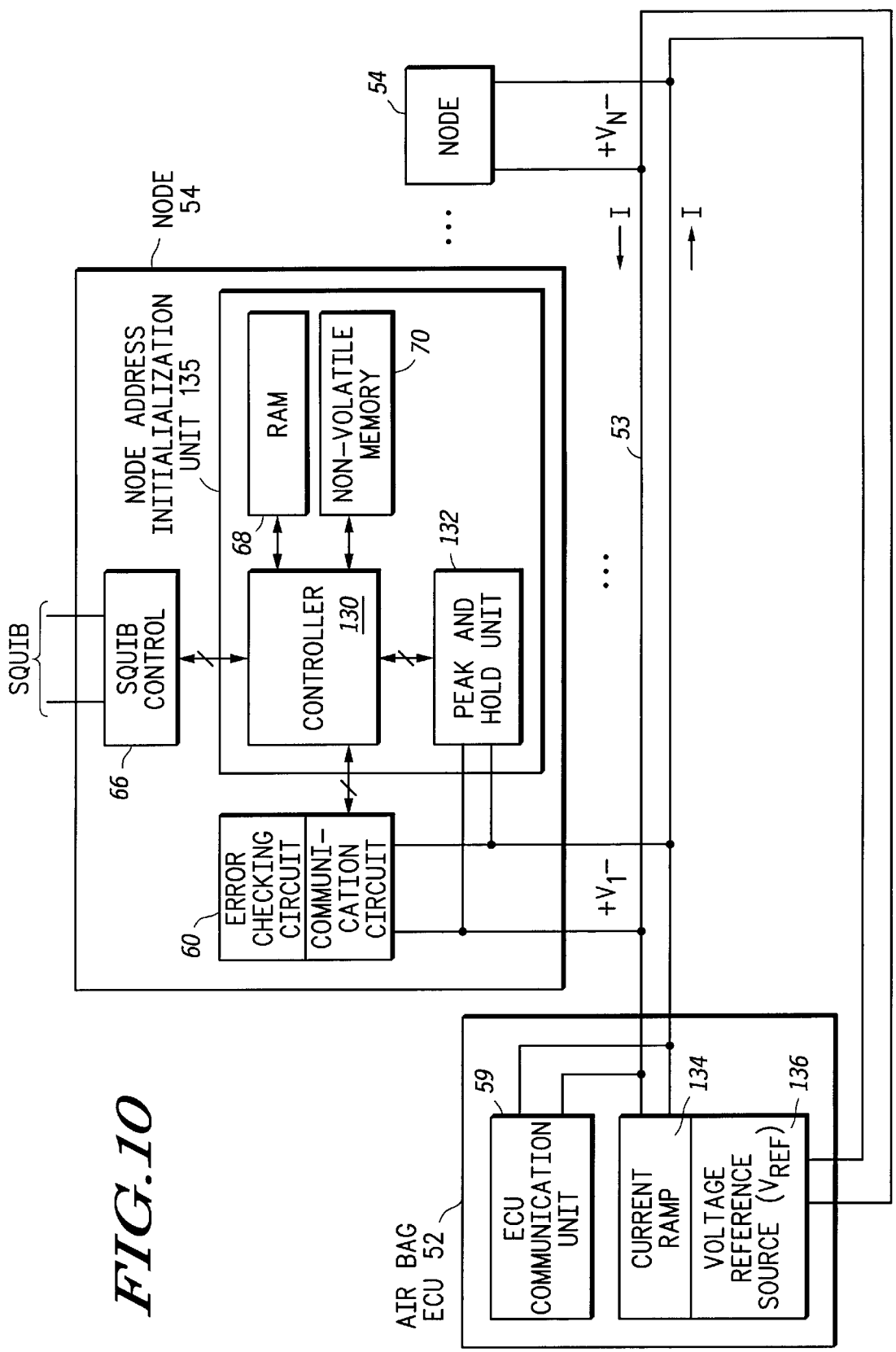

FIG. 10 illustrates a system analogous to FIG. 9 in operation, but FIG. 10 uses the ring configuration of FIG. 6 instead of the tree configuration of FIG. 9. In order to implement the current ramp process of FIG. 9 in the ring architecture of FIG. 10, the voltage reference source unit 136 is moved on chip with the current ramp circuitry 134. The communication bus 60 then forms a ring between the current ramp circuit 134 and the voltage reference source unit 136. As was the case between FIGS. 5 and 6, the systems of FIGS. 9 and 10 are very similar in structure and very similar in methodology. Therefore, the discussion of FIG. 9 will generally apply to the discussion of FIG. 10 with the unit 136 being internally controlled by the ECU 52 instead of being externally controlled as in FIG. 9.

Figure 11:
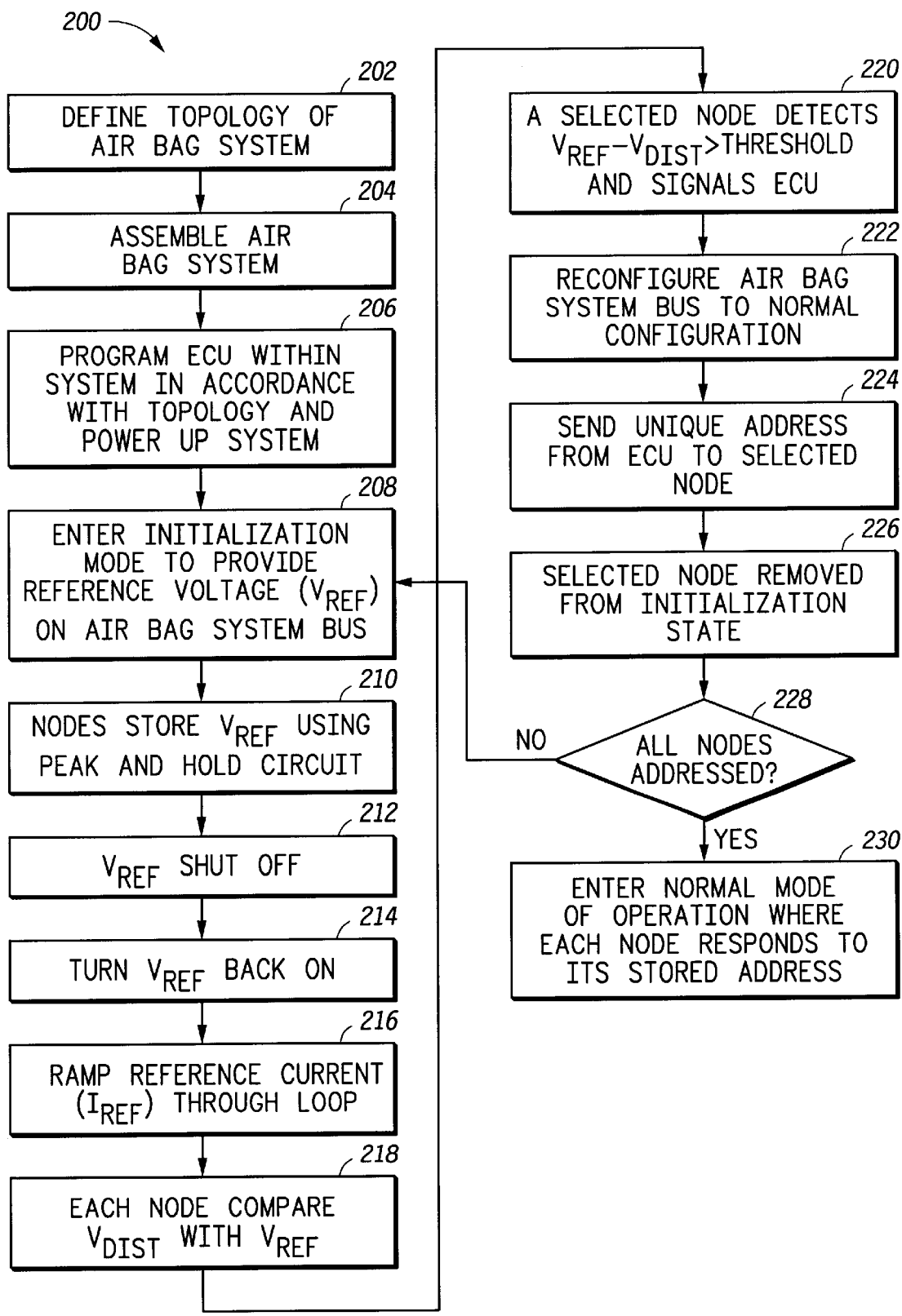
FIG. 11 illustrates, in a flow chart, an alternate methodology to that previously illustrated in FIGS. 7–8 in accordance with the present invention.

FIG. 11 illustrates a method of operation which may be used in accordance with the systems of FIGS. 9 and 10 when used in the transportation application shown in FIG. 4. In the method 200 of FIG. 11, the steps 202–206 are analogous and substantially similar to the steps 82–86 of FIGS. 7–8. In FIG. 11, a step 208 will enter the initialization mode and provide the reference voltage (Vref) on the airbag system communication bus via the unit 136. As previously discussed, during step 208, no current is flowing along the communication bus whereby every node 54 should be receiving the same reference voltage, assuming leakage current is negligible. In a step 210, all of the nodes within the systems shown in FIGS. 9 and 10 will store a trigger voltage that is a function of the reference voltage (Vref) across their terminals. This trigger voltage is stored within a capacitor or like element/system in the circuit 132.

Once the reference voltage is stored within a capacitor inside the peak and hold unit 132 of each node 54, a step 212 will signal the end of the Vref storage phase, e.g. by shutting Vref off to signal to the nodes 54 that the next stage of initialization is to begin. In a step 214, the Vref voltage from the unit 136 is turned back on and the current output from the unit 134 is ramped from no current to some maximal initialization current in a step 216 until a trigger event is detected. The presence of the fixed voltage 136 and the changing of the current 134 will ensure that the differential voltages across each and every node 54 will change at different rates since these nodes are located at different positions on the resistive communication bus interface.

In a step 218, each node is constantly comparing the voltage across their differential inputs with the previously stored trigger voltage that is a function of the Vref voltage in a step 218. Since each node 54 is subject to a different resistance from the communication bus the current ramp will push the differential input voltage of one node V1–VN to the trigger point before all others. Therefore, due to the current ramp, one selected node 54 will reach the stored trigger voltage within the peak and hold unit 132 before all other nodes 54 reach this value. This selected node, which can be engineered as being the closest node or the furthest node from the ECU 52 depending upon placement of the units 134 and 136 in the system, is the selected node in step 220 of FIG. 10.

Once a selected node is determined, the controller 130 of the selected node 54 will short circuit the communication bus via its respective interface 60. The ECU 52 will detect this short circuiting of the communication bus and reconfigure the airbag system communication bus to a normal configuration in the step 222. After short circuiting the communication bus, the controller of the selected node will configure the communication circuit to receive a unique address whereas all of the other untriggered nodes 54 will ignore any address communication. The step 224 of FIG. 10 then provides the unique address from the ECU communication unit 59 to the one triggered node 54 in the system. This unique address is only accepted by the one triggered/selected node 54, and the unique address is stored in the: selected node's respective non-volatile memory 70.

In step 226, the selective node is removed from its initialization state and the peak and hold circuit 132 of such selected node 54 is decoupled from the communication bus and will participate in no more current ramp operations. The address programmed nodes will ignore any communication bus operations (i.e., the ramp initialization operations and all other operations) until the ECU 52 sends an "initialization done" data packet sequence to all nodes 54 on the communication bus. Note that if the address communication to the selected node 54 fails due to CRC failure detected in the selected node's unit 60, then the selected node 54 can notify the ECU 52 of such event by shorting the communication bus. If the ECU 52 notices that the communication bus was shorted prematurely during address communication or during early stages of the beginning of the next ramp process, then the ECU 52 knows that it must recommunicate the address to the last selected node 54. Such handshaking will repeatedly occur until the address is correctly programmed into the selected node 54, or until the initialization operation times out and delivers an error message due to the inability of the system to program the nodes 54. In another embodiment, an acknowledgment may be sent from unit 60 once receipt is complete and proper, and if no acknowledgment is initiated by unit 60, then the information may be resent within the system.

In a step 228, the ECU communication unit 59, which knows the topography of the system from step 206, determines if any other nodes in the system remain unaddressed. If nodes remain unaddressed, the steps 208–228 are repeated until each and every node 54 within the system is sequentially triggered and serially provided with a unique address from the ECU 52. Once the last node 54 within the system is provided with a unique address where all CRC values show no errors, the normal node of operation is entered via a step 230 of FIG. 10 whereby each node 54 is "awakened" from its "ignore initialization" state by a start data packet sent out by the ECU 52 along the communication bus. All the nodes 54 in the system of FIGS. 9–10 are now responsive to a unique address within the system.

Although the invention has been described and illustrated with reference to specific embodiments, it is not intended that the invention be limited to those illustrative embodiments. Those skilled in the art will recognize that modifications and variations may be made without departing from the spirit and scope of the invention. Therefore, it is intended that this invention encompasses all the variations and modifications as fall within the scope of the appended claims.

What is claimed is:

1. A method for initializing a distributed control system, the distributed control system having a control unit and at least one node coupled to a common communication bus, the distributed control system having a predetermined topology, the method comprising:

making a measurement to determine measurement information corresponding to said node; and assigning a specific address to said node based on said measurement information.

2. The method of claim 1, wherein the measurement includes at least one measurement selected from a group consisting of voltage potential, current, optical measure, thermal measure, resistivity, and a change in parameter.

3. The method of claim 1, wherein said node is a generic node.

4. The method of claim 3, wherein said generic node includes no predetermined unique identifier prior to assigning the specific address.

5. The method of claim 1, wherein the measurement information is used to determine a distance from the control unit to said node, and the specific address is based on said distance.

6. A method for initializing a distributed control system, the distributed control system having a control unit and at least one node coupled to a common communication bus, the distributed control system having a predetermined topology, the method comprising:

assigning a specific address to said node based on a parameter of the communication bus, wherein a value of the parameter varies along a length of said communication bus.

7. The method of claim 6, wherein said node is a generic node.

8. The method of claim 7, wherein said generic node includes no predetermined unique identifier prior to assigning the specific address.

9. The method of claim 6, wherein assigning the specific address to said node is further characterized as being based on a distance from the control unit to said node, wherein the parameter of the communication bus is used to determine said distance.

10. The method of claim 6, wherein the distributed control system has a plurality of generic nodes coupled to said communication bus, the method further comprising assigning a specific address to each node based the parameter of the communication bus.

11. The method of claim 10, wherein a value of the parameter at each of the plurality of generic nodes differ from each other.

12. A method for initializing a distributed control system, the distributed control system having a control unit and at least one node coupled to a common communication bus, the distributed control system having a predetermined topology, the method comprising the steps of:

assigning a specific address to said node based on a relative location of said node in the predetermined topology, wherein said relative location corresponds to a distance from the control unit to said node.

13. The method of claim 12, wherein the distance from said control unit to said node differs from the distance from the control unit to each other node by at least a predetermined minimum distance.

14. The method of claim 12, wherein, within the predetermined topology, the relative location of each node on the common communication bus, relative to the control unit, is selected such that the distance from said control unit to said node differs from the distance from the control unit to each other node.

15. The method of claim 14, wherein the distance from said control unit to said node differs from the distance from the control unit to each other node by at least a predetermined minimum distance.

16. The method of claim 12, wherein determining the distance from the control unit to each node, further comprises:

sending a data value on the communication bus from said node to the control unit, wherein the data value is related to the location of said node;

determining validity of said data value; and resending the data value if the data value is not valid.

17. The method of claim 16, wherein determining validity is performed by the control unit.

18. The method of claim 16, wherein determining validity is performed by said node.

19. The method of claim 16, wherein resending is further characterized as resending, after a random time interval, said data value.

20. The method of claim 12, wherein assigning a specific address further comprises:

correlating the distance of said node to a predetermined node function; and wherein the specific address is related to said node function.

21. The method of claim 20, wherein assigning is performed by the control unit.

22. The method of claim 21, further comprising communicating said address to said node via said common communication bus.

23. The method of claim 12, wherein each node is a generic node and includes no predetermined unique identifier prior to assigning the specific address.

24. The method of claim 12, wherein assigning the specific address further comprises determining the distance from the control unit to said node using at least one measurement selected from a group consisting of voltage potential, current, optical measure, thermal measure, resistivity, and a change in a parameter.

25. A node, adapted for use in a control system having a common bus, a control unit coupled to the common bus, and a second node coupled to the common bus, the node comprising:

measuring circuitry, the measuring circuitry adapted to measure a first value of a parameter of the common bus corresponding to the node, wherein:

the parameter has a second value corresponding to the second node, the second value differing from the first value.

26. The node of claim 25, wherein:

when coupled to the common bus, the common bus has a first length value between the node and the control unit and a second length value, different from the first length value, between the second node and the control unit; and values of the parameter vary along a length of the common bus.

27. The node of claim 26, further comprising:

control circuitry coupled to the measuring circuitry and adapted to communicate with the control unit to provide distance information based on the first value of the parameter to the control unit and to receive a unique identifier from the control unit.

28. A node, adapted for use in a control system having a common bus and a control unit coupled to the common bus, the node comprising:

measuring circuitry, the measuring circuitry adapted to measure a first distance from the node to the control unit; and control circuitry coupled to the measuring circuitry, the control circuitry adapted to provide distance information based on the first distance to the control unit and to receive a unique identifier from the control unit.

29. The node of claim 28, wherein the control system includes a second node coupled to the common bus, wherein the second node is coupled to the common bus at a second distance from the control unit, the second distance different from the first distance.

30. The node of claim 28, wherein the measuring circuitry includes at least one of voltage potential measurement circuitry, current measurement circuitry, optical measurement circuitry, thermal measurement circuitry, resistivity measurement circuitry, or change in parameter measurement circuitry.

31. A node, adapted for use in a control system having a common bus and a control unit coupled to the common bus, the node comprising:

measuring circuitry, the measuring circuitry adapted to determine measurement information of the common bus corresponding to the node; and control circuitry coupled to the measuring circuitry, the control circuitry adapted to provide the measurement information to the control unit and to receive a unique identifier from the control unit based on the measurement information.

32. The node of claim 31, further comprising:

memory circuitry, coupled to the measuring circuitry and the control circuitry, the memory circuitry adapted to store the measurement information and the unique identifier.

33. A control system, comprising:

a communication bus;

a first node coupled to said communication bus;

a second node coupled to said communication bus; and measuring circuitry, coupled to said communication bus, said measuring circuitry measuring a first value of a parameter of said communication bus corresponding to the first node and a second value of the parameter corresponding to the second node, wherein:

the first value is different from the second value; and the communication bus has a first length between the first node and the measuring unit and a second length between the second node and the measuring unit, said first length different from said second length.

34. The control system of claim 33, wherein the measuring circuitry comprises:

a first measuring unit corresponding to the first node, said first measuring unit measuring the first value; and a second measuring unit corresponding to the second node, said second measuring unit measuring the second value.

* * * * *